US012100567B2

(12) United States Patent
Rose-Pötzsch

(10) Patent No.: US 12,100,567 B2
(45) Date of Patent: Sep. 24, 2024

(54) DRIVE UNIT FOR DRIVING SWITCHING CONTACTS OF A HIGH-VOLTAGE CIRCUIT BREAKER

(71) Applicant: Siemens Energy Global GmbH & Co. KG, Munich (DE)

(72) Inventor: Alexander Rose-Pötzsch, Panketal (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 147 days.

(21) Appl. No.: 17/909,019

(22) PCT Filed: Feb. 11, 2021

(86) PCT No.: PCT/EP2021/053282
§ 371 (c)(1),
(2) Date: Sep. 2, 2022

(87) PCT Pub. No.: WO2021/175554
PCT Pub. Date: Sep. 10, 2021

(65) Prior Publication Data

US 2023/0109652 A1 Apr. 6, 2023

(30) Foreign Application Priority Data

Mar. 2, 2020 (DE) ..................... 10 2020 202 640.8

(51) Int. Cl.
*H01H 3/46* (2006.01)
*H01H 33/02* (2006.01)

(52) U.S. Cl.
CPC ........... *H01H 3/46* (2013.01); *H01H 33/022* (2013.01); *H01H 2033/024* (2013.01)

(58) Field of Classification Search
CPC .. H01H 3/46; H01H 33/022; H01H 2033/024; H01H 33/42; H01H 33/02
See application file for complete search history.

(56) References Cited

U.S. PATENT DOCUMENTS 6,380,504 B1 4/2002 Klocke et al.
6,943,307 B2 * 9/2005 Hunger ................ H01H 33/022 218/7

(Continued)

FOREIGN PATENT DOCUMENTS

DE 19913059 A1 10/2000
DE 102018205910 A1 10/2019

(Continued)

*Primary Examiner* — Lheiren Mae A Caroc
(74) *Attorney, Agent, or Firm* — Laurence A. Greenberg; Werner H. Stemer; Ralph E. Locher

(57) ABSTRACT

A drive unit for driving switching contacts of a high-voltage circuit breaker includes an operating element, and a plurality of actuating elements for actuating the switching contacts, at least two of which are disposed at a distance from one another relative to an axis or shaft. A mechanism or lever mechanism transfers a movement of the operating element into corresponding movements of the actuating elements. The mechanism includes at least one shaft, rotatably mounted on the axis, for transferring the movement of the operating element into the corresponding movement of at least one actuating element which is disposed at a distance from the operating element along the axis. The drive unit has a compensation coupling device for compensating for a delay in the transfer of movement between at least two of the actuating elements disposed at a distance from one another relative to the axis.

11 Claims, 3 Drawing Sheets

(56) References Cited

U.S. PATENT DOCUMENTS

| | | | | |
|---|---|---|---|---|
| 11,764,011 | B2 * | 9/2023 | Kosse ...................... | H01H 3/30 218/118 |
| 2021/0183598 | A1 | 6/2021 | Cernat et al. | |

FOREIGN PATENT DOCUMENTS

| | | | |
|---|---|---|---|
| KR | 200420983 | Y1 | 7/2006 |
| WO | 2017162404 | A1 | 9/2017 |
| WO | 2017162405 | A1 | 9/2017 |

* cited by examiner

DRIVE UNIT FOR DRIVING SWITCHING CONTACTS OF A HIGH-VOLTAGE CIRCUIT BREAKER

FIELD AND BACKGROUND OF THE INVENTION

The invention relates to a drive unit for driving switching contacts of a high-voltage circuit breaker, comprising (i) an operating element, (ii) a plurality of actuating elements for actuating the switching contacts, at least two of said actuating elements being arranged at a distance from one another with respect to an axis, and (iii) a mechanism, in particular lever mechanism, for transferring a movement of the operating element into corresponding movements of the actuating elements, wherein the mechanism comprises at least one shaft, which is rotatably mounted on the axis, for transferring the movement of the operating element into the corresponding movement of at least one actuating element which is arranged at a distance from the operating element in the axial direction of the axis.

DE 10 2018 205 910 A1 shows a single-pole high-voltage circuit breaker in dead-tank design, with a switching unit, a closing resistor unit, and a drive unit for driving switching contacts of the switching unit and the closing resistor unit. The longitudinal axes of the switching unit and the closing resistor unit, on which the various switching contacts also move, run at a distance from one another. The drive unit comprises (i) an operating element which can be moved axially with respect to a longitudinal axis of the switching unit, (ii) actuating elements which are arranged at a distance from one another with respect to a transverse axis and are intended for actuating the switching contacts, and a mechanism for transferring a movement of the operating element into corresponding movements of the actuating elements. The mechanism in that case comprises at least one shaft mounted rotatably on the axis to transfer the movement of the operating element into the corresponding movement of the actuating element for the switching contact of the closing resistor unit, said actuating element being arranged axially offset in relation to the operating element. The movement of the switching contact of the switching unit, said contact not being shown directly in this document, is generated directly from the movement of the operating element, for example via a rigid intermediate element. In such applications, however, it is not so critical if the switching of the switching elements is not performed precisely at the same time or with a well-defined delay.

The switching movements when driving the switching contacts of a high-voltage circuit breaker are very fast. Therefore, when the switching movement starts, sudden forces occur and result in very high accelerations. When movement is transferred via the rotation of a shaft or similar component, the problem arises that the inertia leads to a torsion of the shaft, so that when movement is transferred over a portion of the shaft, there is a delay in the transfer of movement depending on the length of the portion. This is much more critical in the case of a high-voltage circuit breaker of multi-pole design, in which the switching contacts of the interrupter units of the individual poles, for example, are switched via such a drive unit.

Document DE 199 13 059 A1 presents a high-voltage circuit breaker having three switch poles, wherein each switch pole has at least one interrupter unit of which the drivable switching contact can be operated by a switching rod by means of a common switch drive in such a way that, during a closing process, time-delayed closing takes place at least between the interrupter units of two switch poles, wherein at least the switching rod of a first switch pole is connected to the switch drive via a lever. In order to achieve a time-delayed closing of the interrupter unit of a switch pole or of the interrupter units from switch pole to switch pole during the closing process, only the switching rod of the second and/or third switch pole is connected to the switch drive by means of spring elements which can be compressed during a closing process and which expand after the contact is made.

SUMMARY OF THE INVENTION

Proceeding from the aforementioned inertia problem in conjunction with a shaft, the object of the invention is to describe a drive unit with shaft for transfer of movement, in which the drive of the actuating elements arranged at a distance from each other on the axis can be precisely synchronized.

The object is achieved in accordance with the invention by the features described below. Advantageous embodiments of the invention are the subject of the dependent claims.

In the drive unit according to the invention for driving switching contacts of a high-voltage circuit breaker, comprising (i) an operating element, (ii) a plurality of actuating elements for actuating the switching contacts, at least two of said actuating elements being arranged at a distance from one another with respect to an axis, and (iii) a mechanism, in particular lever mechanism, for transferring a movement of the operating element into corresponding movements of the actuating elements, wherein the mechanism comprises at least one shaft, which is rotatably mounted on the axis, for transferring the movement of the operating element into the corresponding movement of at least one actuating element which is arranged at a distance from the operating element in the axial direction of the axis, it is provided that said drive unit further has a compensation coupling device for compensating for a delay in the transfer of movement between at least two actuating elements from amongst the actuating elements which are arranged at a distance from one another with respect to the axis. In particular, the mechanical system comprises the compensation coupling element.

The compensation coupling device is used in particular as a push and/or pull rod. It thus "replaces" a rigid coupling rod (push rod and/or pull rod) that would otherwise be used.

According to a preferred embodiment of the invention, the compensation coupling device comprises a spring arrangement with at least one spring element, in particular a disc spring. This spring element serves as a temporary energy store and provides a delay in the transfer of energy or force. Alternatively, the compensation coupling device has another energy storage arrangement with at least one energy storage element.

In particular, it is provided here that the compensation coupling device further comprises means for biasing the at least one spring element. In particular, these means are configured to adjustably bias the at least one spring element.

Furthermore, it is advantageously provided that different decelerations can be achieved with a preselected number and/or shape of the spring elements or energy storage elements. This allows a variable adjustment of the movement sequences. Among other things, it is also possible to variably adjust the closing and opening movements separately from one another. For this purpose, for example, spring elements with different spring constants are used and/or the spring travel of the individual spring elements is predefined in a targeted manner.

According to a further preferred embodiment of the invention, one of the actuating elements has no distance with respect to the axial orientation of the axis relative to the operating element. During the transfer of movement to this actuating element, therefore, there is no torsion or inertia problem in conjunction with the shaft.

In this embodiment, it is provided in particular that the compensation coupling device is arranged in a transfer path between the operating element and the actuating element, which is not distanced from the operating element with respect to the axis. The balance/compensation therefore takes place in this transfer path.

According to yet a further preferred embodiment of the invention, the mechanism formed as lever mechanism comprises a main lever arranged on the shaft and coupled to the operating element, and at least one further lever axially distanced with respect to the main lever. These levers are generally used as reversing levers.

It is advantageously provided here that the operating element, the main lever, the compensation coupling device, and the actuating element, which axially has no distance from the operating element, are arranged in one plane. The transfer path in this plane does not run axially over the shaft and can be realized solely via a type of linkage.

In conjunction with said lever mechanism embodiment, it is provided that the compensation coupling device is directly coupled to the main lever.

Furthermore, it is advantageously provided that the main lever is designed as a two-ended lever. Preferably, the operating element is coupled to one end and the compensation coupling device and the actuating element, which axially has no distance from the operating element, are coupled to the other end.

A further embodiment of the invention provides that a lever—preferably used as a bell crank—is furthermore arranged in the transfer path between the operating element and the actuating element, which axially has no distance from the operating element.

The invention further relates to a high-voltage circuit breaker having at least two switch poles, in particular in a three-pole configuration, and to an aforementioned drive unit for driving switching contacts of the high-voltage circuit breaker.

The above-described properties, features, and advantages of the present invention, as well as the way in which they are achieved, will become clearer and more readily understandable in conjunction with the following description of an exemplary embodiment, which will be explained in greater detail in conjunction with the drawings.

DETAILED DESCRIPTION OF THE INVENTION

Figure 1:
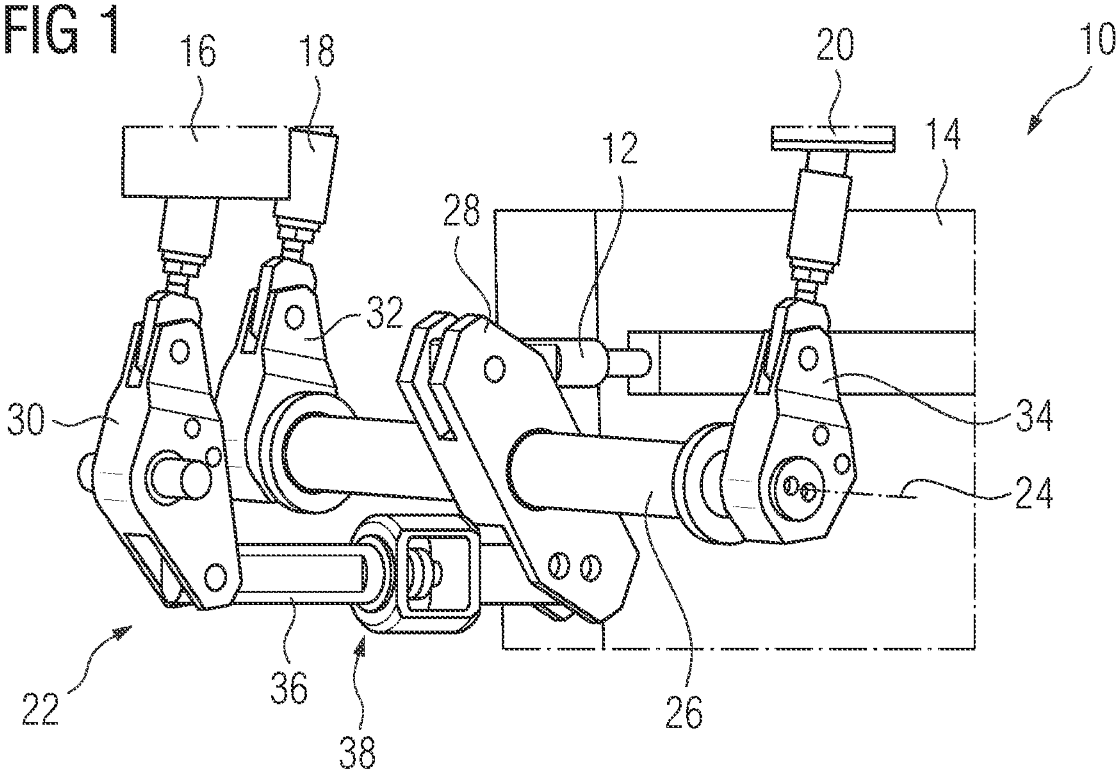
FIG. 1 shows a drive unit for driving switching contacts of a high-voltage circuit breaker according to a preferred embodiment of the invention.
Figure 5:
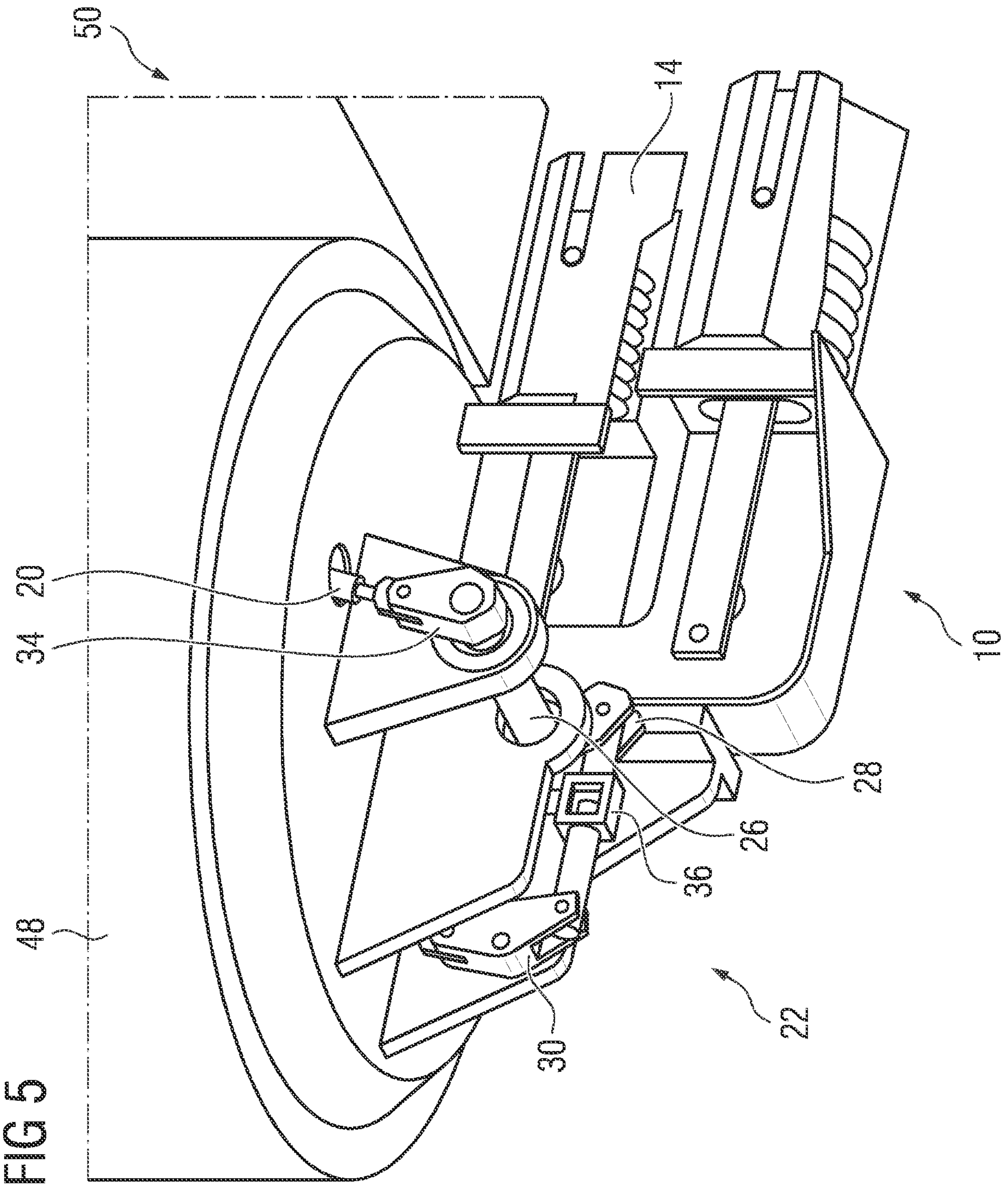
FIG. 5 shows a part of the high voltage circuit breaker with the drive unit and the drive actuator.

FIG. 1 shows a drive unit 10 for driving switching contacts of a high-voltage circuit breaker 50 of multi-pole design shown at least in part in FIG. 5.

The drive unit 10 comprises an operating element 12, a drive actuator 14 driving the operating element 12, a plurality of (here in the example three) actuating elements 16, 18, 20 for actuating the switching contacts, and a mechanism 22 formed as a lever mechanism for transferring a movement of the operating element 12 into corresponding movements of the actuating elements 16, 18, 20. Central elements of the mechanism 22 are a shaft 26 mounted rotatably on an axis 24, and a main lever 28 connected to this shaft 26 fixedly or at least non-rotatably. This main lever 28 is formed as a two-ended lever with respect to the axis 24. Furthermore, the mechanism 22 comprises three levers 30, 32, 34, which are assigned to one each of the actuating elements 16, 18, 20, as well as a compensation coupling device 26 acting in the manner of a coupling rod, i.e. as a pull and/or push rod. The operating element 12 acts directly on the main lever 28, or more precisely on one end of the main lever 28. The three levers 30, 32, 34 act as deflection levers in the drive unit 10.

One of the actuating elements 16 has no distance from the main lever 28 with respect to the axial direction of the axis 24. The operating element 12, the main lever 28, the compensation coupling device 36, and this actuating element 16, which axially has no distance relative to the operating element 12 and the main lever, are arranged in a plane perpendicular to the axis 24. Here, the transfer of movement between the operating element 12 and this actuating element 16 takes place via a pure linkage arrangement and not via the shaft 26. The corresponding linkage arrangement is formed by the main lever 28, the compensation coupling device 26, and one of the three levers 30.

The other two of the three levers 32, 34 are arranged on the shaft 26 axially at a distance with respect to the main lever 28 and are connected to the shaft fixedly or at least non-rotatably. The actuating elements 18, 20 associated with these levers 32, 34 (hereinafter referred to as “the other actuating elements”) are also arranged axially at a distance with respect to the main lever 28.

Thus, all three actuating elements 16, 18, 20 for actuating the switching contacts are arranged at a distance from each other with respect to the axis 24, wherein one of the actuating elements 16 has no distance from the operating element 12 with respect to the axis 24, and the other actuating elements 18, 20 and their associated levers 32, 34 are arranged to the right and left of said plane with the main lever 28 with respect to the axial orientation of the axis 24. The distance of the other actuating elements 18, 20 as well as their associated levers 32, 34 is the same (in terms of value) in the present example.

The compensation coupling device 36 now serves to compensate for a delay in the transfer of movement between the one actuating element 16, which is rather directly controlled via the linkage arrangement, and the other actuating elements 18, 20, which are controlled via the shaft 26 with a slight delay—due to the torsion caused by inertia. The compensation coupling device 36 has a spring arrangement 38 with at least one spring element (here in the example two disc springs). This serves as a temporary energy store and ensures a delay in the transfer of energy or force to the one actuating element 16. The compensation coupling device 36 is used here as a coupling rod (push rod and/or pull rod) and thus “replaces” an otherwise used rigid coupling rod.

The compensation coupling device 36 consists of two rod parts arranged one behind the other on a common axis and coupled via the spring arrangement 38. The two spring elements 42, which are in the form of disc springs, are threaded onto a pin-like axis element 40 of the one rod part, wherein a part of a cage 44, which engages around the one spring element 42, of the other rod part is arranged between the two spring elements 42. Furthermore, the compensation coupling device comprises means for biasing at least one of the spring elements 42. In particular, these means are configured to adjustably bias the spring elements 42. In the present case, these means are of particularly simple design. The pin-like axis element 40 has an external thread, which, together with at least one nut or other counter element, forms a screw connection 46 via which the spring elements 42 can be adjustably biased.

Figure 2:
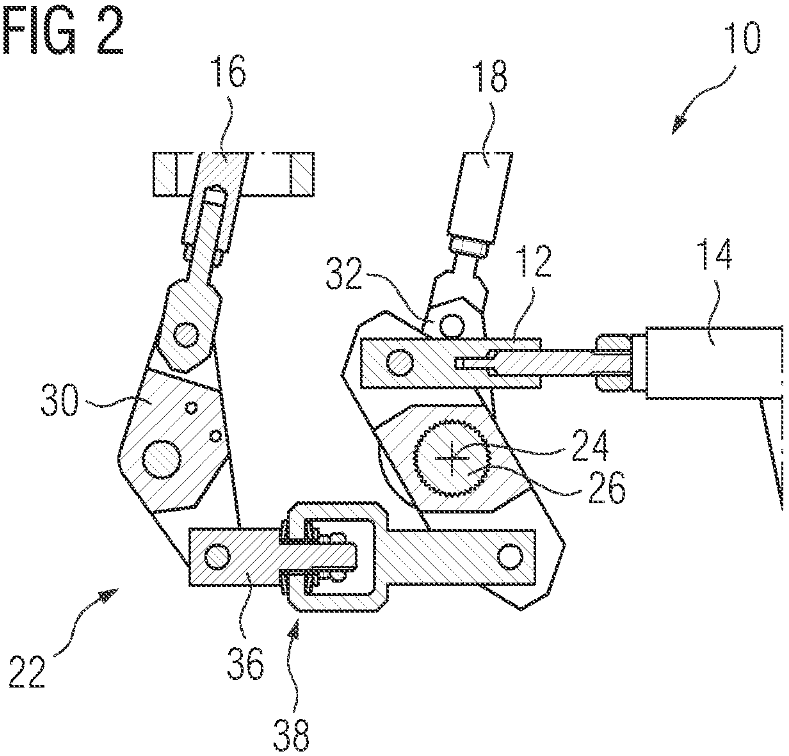
FIG. 2 shows the drive unit in a sectional view, in which the sectional plane passes through a compensation coupling device of the drive unit.

FIG. 2 shows the drive unit 10 in a sectional view in which the sectional plane is the aforementioned plane in which the operating element 12, the main lever 28, the compensation coupling device 36, and the actuating element 16, which axially has no distance from the operating element 12 and the main lever, are arranged.

Figure 3:
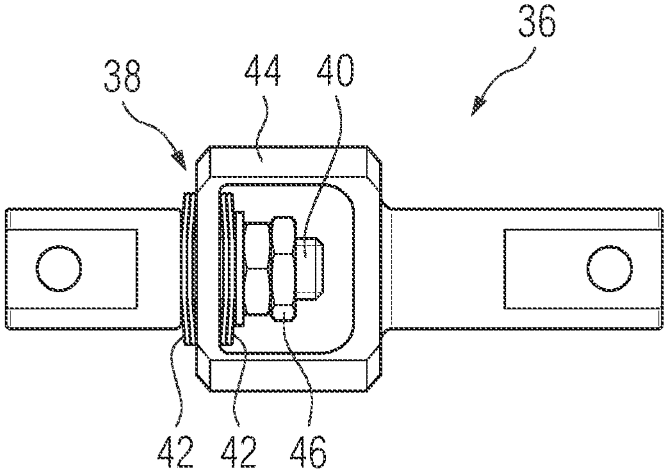
FIG. 3 shows details of the compensation coupling device.

FIG. 3 shows details of the compensation coupling device 36. In this illustration, it is once again clear that the compensation coupling device 36 is used in the linkage arrangement as a coupling rod. Furthermore, the two rod parts arranged one behind the other on the common axis, which are coupled via the spring arrangement 38, can be seen clearly. The two spring elements 42 are arranged on the pin-like axis element 40 of the one rod part, wherein an element of the other rod part is arranged between the two spring elements 42. Furthermore, the screw connection 46 formed by the pin-like axis element 40 with its external thread and the nuts is clearly visible.

Figure 4:
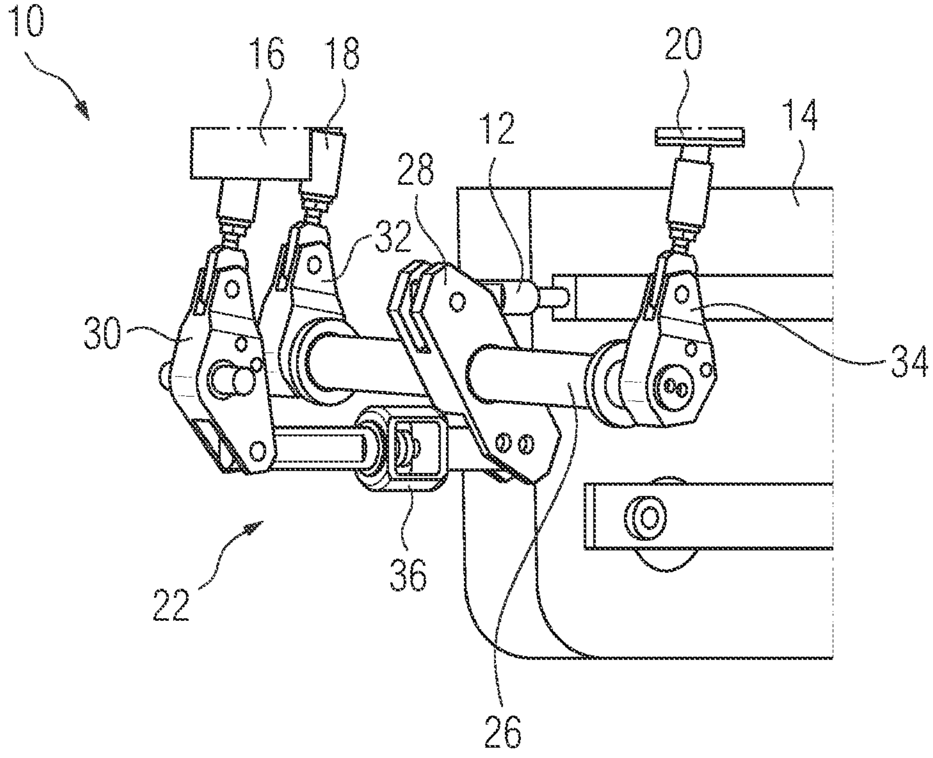
FIG. 4 shows the drive unit and a drive actuator.

FIG. 4 shows a side view of the drive unit 10 together with a large part of the drive actuator 14, which is formed as a spring-loaded drive.

Lastly, FIG. 5 shows the drive unit 10 and the drive actuator 14 at one end of the switching unit 48 of the corresponding high-voltage circuit breaker 50. This circuit breaker in the present case has a dead-tank design.

In the following, important features of the invention will be discussed again in other words on the basis of the embodiment shown.

The force applied by the drive actuator 14 to the main lever 28 causes the shaft 26 to rotate. Due to the high forces and speeds, a rotation angle occurs at the levers 32, 34 at the ends of the shaft 26 caused by the moment of inertia of the shaft 26.

If the lever 30 is coupled directly to the main lever 28—for example via a rigid coupling device—there is a direct transfer of force here. In the case of the other levers 32, 34, the force applied by the spring-loaded drive is delayed due to the rotation angle of the shaft 26. Thus, the levers 30, 32, 34 are moved with different starting points or speeds, which leads to a different galvanic contact time of the different poles.

To solve the problem, instead of a rigid coupler, a coupler is used which reacts in a delayed manner to the application of force by the spring accumulator. This coupling is formed by the compensation coupling device 36.

Depending on the rotation angle of the shaft 26, the coupler 36 is decoupled by spring elements 42 (here disc springs). The spring travel and the subsequent block of the spring elements 42 can thus generate any delay, especially in the millisecond range (ms range). This is possible in both an OPEN and CLOSED direction or only for OPEN or CLOSED. Thus, the delayed response of the levers 32, 34 can be synchronized with the response behavior of the lever 30.

The invention claimed is:

1. A drive unit for driving switching contacts of a high-voltage circuit breaker, the drive unit comprising:

an operating element;

an axis;

a plurality of actuating elements for actuating the switching contacts, at least two of said actuating elements being disposed at a distance from one another with respect to said axis;

a mechanism for transferring a movement of said operating element into corresponding movements of said actuating elements, said mechanism including at least one shaft rotatably mounted on said axis for transferring the movement of said operating element into a corresponding movement of at least one of said actuating elements disposed at a distance from said operating element in an axial direction of said axis; and a compensation coupling device for compensating for a delay in the transfer of movement between at least two of said actuating elements disposed at a distance from one another with respect to said axis.

2. The drive unit according to claim 1, wherein said compensation coupling device includes a spring arrangement with at least one spring element.

3. The drive unit according to claim 2, wherein said compensation coupling device includes a device for biasing said at least one spring element.

4. The drive unit according to claim 1, wherein one of said actuating elements is disposed at no distance along said axis from said operating element.

5. The drive unit according to claim 4, wherein said compensation coupling device is disposed in a transfer path between said operating element and said one actuating element disposed at no distance along said axis from said operating element.

6. The drive unit according to claim 5, which further comprises a lever disposed in said transfer path between said operating element and said one actuating element disposed at no distance along said axis from said operating element.

7. The drive unit according to claim 1, wherein said mechanism is formed as a lever mechanism including:

a main lever disposed on said at least one shaft and coupled to said operating element, and at least one further lever axially distanced from said main lever.

8. The drive unit according to claim 7, wherein one of said actuating elements is disposed at no distance along said axis from said operating element, and said operating element, said main lever, said compensation coupling device, and said one actuating element disposed at no distance along said axis from said operating element, are disposed in one plane.

9. The drive unit according to claim 7, wherein said compensation coupling device is directly coupled to said main lever.

10. The drive unit according to claim 7, wherein said main lever is a two-ended lever.

11. The drive unit according to claim 1, wherein said mechanism is a lever mechanism.

* * * * *